Feb. 26, 1952 — R. WATTS — 2,587,016
SHOCK ABSORBER
Filed Feb. 10, 1948 — 2 SHEETS—SHEET 1
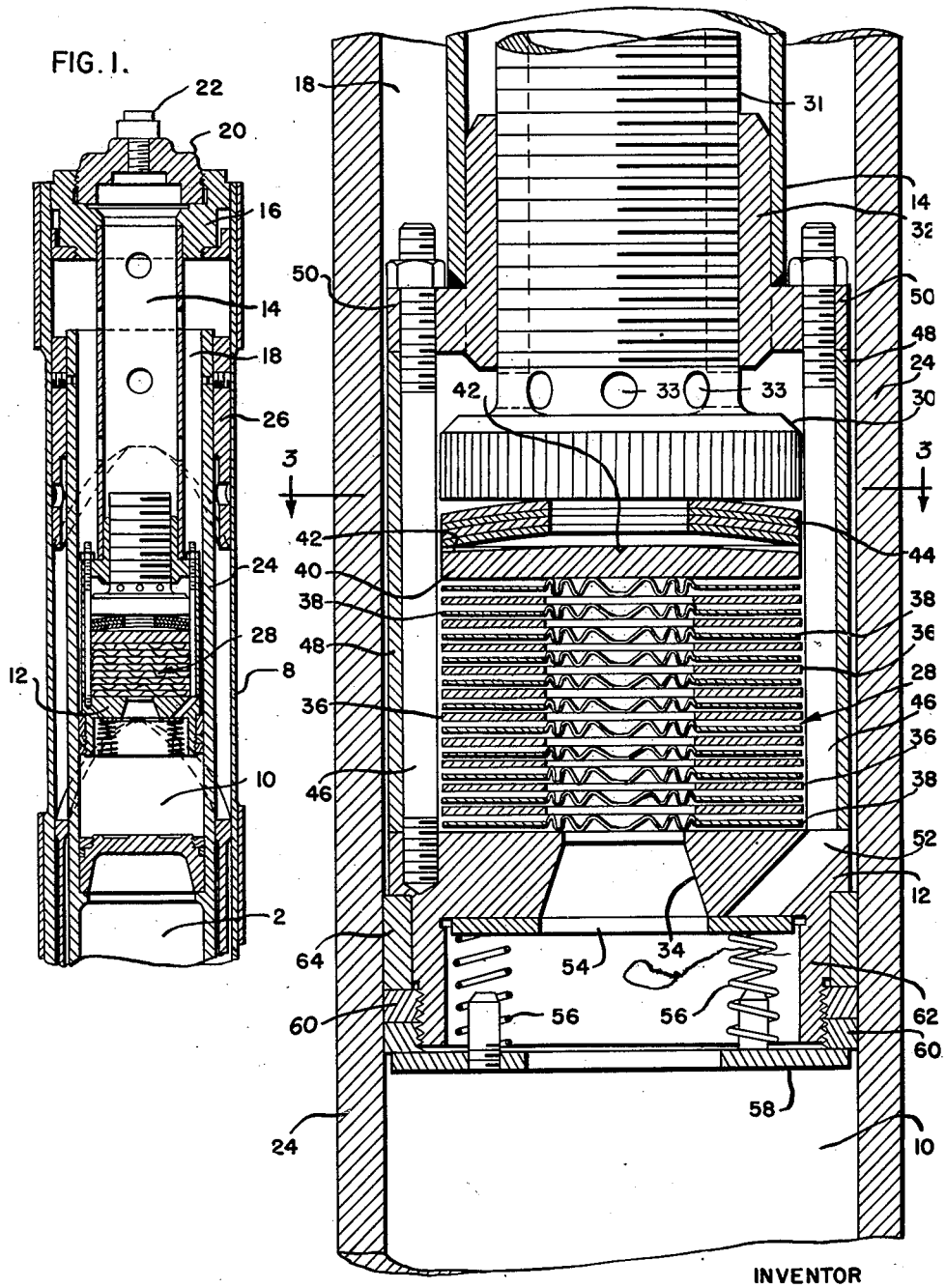
INVENTOR
RAYMOND WATTS
BY
ATTORNEY Feb. 26, 1952        R. WATTS        2,587,016

SHOCK ABSORBER

Filed Feb. 10, 1948        2 SHEETS—SHEET 2

INVENTOR
RAYMOND WATTS
BY
ATTORNEY

Patented Feb. 26, 1952

2,587,016

UNITED STATES PATENT OFFICE 2,587,016

SHOCK ABSORBER

Raymond Watts, Chicago, Ill., assignor to American Steel Foundries, Chicago, Ill., a corporation of New Jersey Application February 10, 1948, Serial No. 7,437

14 Claims. (Cl. 267—64)

1

This invention relates to hydraulic shock absorbers and more particularly to a novel oleo shock strut, commonly utilized in the connection between the landing gear and the fuselage of an aircraft.

A primary object of the present invention is to design a rugged shock strut capable of withstanding the severe stresses of landing gear service and comprising a pressure sensitive metering device capable of automatically adjusting the metering orifice area in response to variations in the loads imposed on the strut.

Another object of the invention is to provide novel metering means in a shock absorber, such as above-described, for automatically adjusting the orifice area to compensate for changes in the viscosity of the hydraulic fluid.

Still another object of the invention is to provide a novel metering unit presenting relatively great friction areas along which the metered hydraulic fluid may flow thereby affording relatively great absorption of energy by the shock absorber.

Another object of the invention is to provide means for preadjusting the metering device to vary the resistance thereof to flow of the metered fluid.

This application is a continuation-in-part of my co-pending application Serial Number 792,-667, filed December 19, 1947.

The foregoing and other objects and advantages of the invention will become apparent from a consideration of the following specification and the accompanying drawings, wherein:

Figure 1 is a sectional view taken on the longitudinal axis of an oleo shock strut embodying the invention;

Figure 2 is an enlarged fragmentary sectional view of the structure shown in Figure 1 taken in the planes indicated by the line 2—2 of Figure 3;

Figure 3:
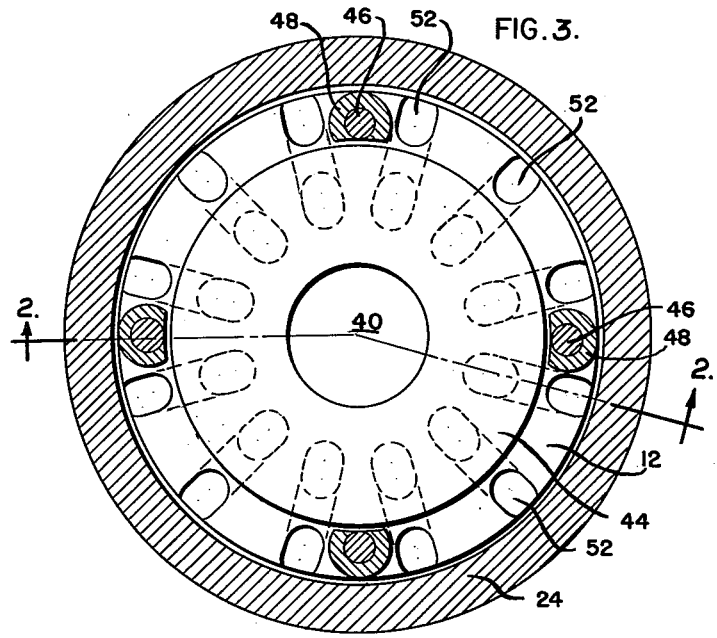
Figure 3 is a cross sectional view taken on the line 3—3 of Figure 2.

Describing the invention in detail, the novel shock strut comprises a piston 2 (Figure 1) adapted for pivotal connection in conventional manner to an associated aircraft wheel and axle assembly (not shown). The piston is reciprocal within a cylinder 8 to define a high pressure or working chamber 10 with a wall or bulkhead 12 of the cylinder suspended by a perforated tube 14 carried by a top wall 16 of the cylinder within a low pressure or reservoir chamber 18 therein.

The top wall 16 is provided with a removable threaded plug 20 equipped with an air valve or fitting 22 for filling the top of the low pressure chamber 18 with compressed air to afford a conventional pneumatic spring for resisting the closure stroke of the strut.

The piston 2 is provided with an extension tube 24 slidably fitted around the bulkhead 12, as hereinafter described in detail, and carrying a bearing 26 slidably fitted within the cylinder 8 thereby affording a structure of great mechanical strength.

Figure 4:
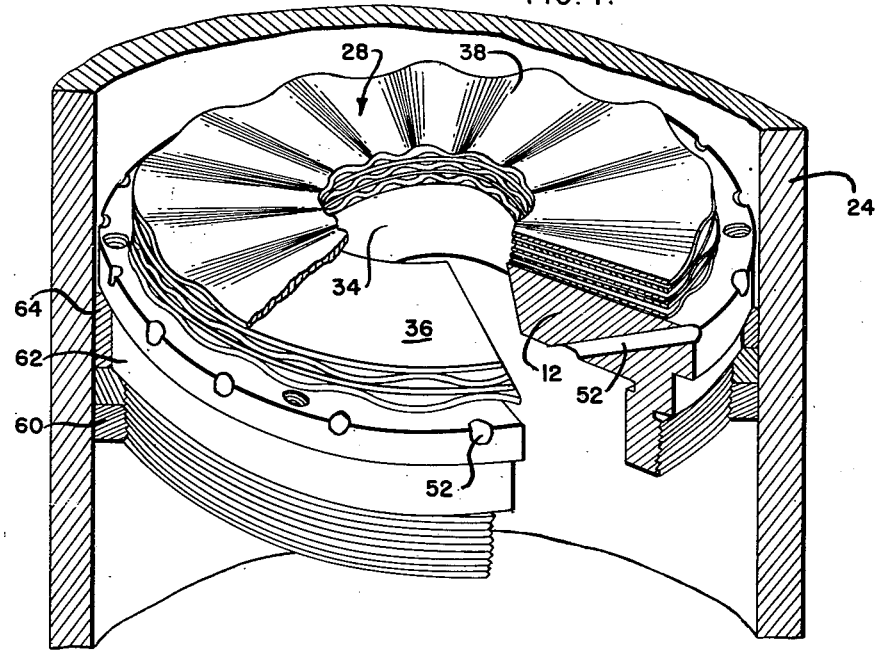
Figure 4 is a fragmentary perspective view of the metering device utilized in the arrangement of Figures 1 to 3.

The tube 14 supports a metering device comprising an axially expansible and contractible resilient unit, generally designated 28 (Figure 1), and shown in detail in Figures 2 to 4. This device comprises an adjustable spring abutment 30 having a hollow shank 31 in threaded engagement with a sleeve 32 mounted in the lower end of the tube 14. The shank 31 is provided with ports 33 to accommodate flow of fluid therethrough. The abutment 30 compresses the resilient unit 28 against the bulkhead or wall 12 which comprises a port 34 connecting the high and low pressure chambers 10 and 18.

The unit 28 comprises a plurality of flat annular discs 36 preferably having an outer diameter of about three inches, an inner diameter of about one and one-quarter inches, and a thickness of about 0.010 inch. Alternately arranged with the plates 36 are a plurality of annular discs 38 formed of tempered steel 0.005 inch thick and having a plurality of radial flutes affording a free height of the order of 0.015 to 0.018 inch for each disc 38. The central openings of the annular discs 36 and 38 are aligned with the port 34 and the entire stack of discs bears against a spring plate 40 having a plurality of radial spring dampening notches 42 in the upper surface thereof for a purpose hereinafter described. A stack of Belleville springs 44 are compressed between the plate 40 and the abutment 30.

The wall or bulkhead 12 is connected by a plurality of bolts 46 and spacers 48 to ears or lugs 50 on the sleeve 32 and said bolts afford convenient position means for the resilient unit 28 comprising the springs 44, the plate 40 and the alternately arranged plates 36 and 38.

The bulkhead 12 is provided with a plurality of by-pass or relief valve ports 52 connecting the high and low pressure chambers. These ports are closed on the compression stroke of the strut by an annular flapper valve plate 54 actuated by a plurality of springs 56 compressed against a plate 58 which is welded or otherwise secured to the lower of a pair of nuts or collars 60 threaded on a depending annular flange 62 of the bulkhead 12 to position a bearing 64 engageable with the extension tube 24 thereby affording slidable substantially fluid-tight engagement therewith.

The spring abutment 30 is adjusted upon removal of the plug 20 to preadjust the pressure on the resilient unit 28, thereby adjusting the frictional resistance to flow of fluid from the high pressure chamber to the low pressure chamber on the compression stroke of the device.

It will be understood that on the compression stroke of the strut, the resilient unit 28 expands and contracts to vary the total orifice area of the interstices between the plates 36 and 38 in direct proportion to the load on the strut in response to variations in the pressure of the hydraulic fluid flowing through these interstices. On the release stroke, the hydraulic fluid by-passes the unit 28, flowing through the ports 52 and forcing the flapper valve plate 54 to open against the resistance of the relatively small capacity springs 56.

As the resilient unit 28 expands and contracts to vary the compression of the Belleville springs 44 in response to variations in fluid pressure within the interstices of the unit, the flexure of the springs 44 is dampened by flow of the hydraulic fluid through the notches 42 thereby frictionally controlling the action of these springs.

It will be understood from the above discussion that the novel adjustable orifice is capable of automatically compensating for variations in load, offering relatively great resistance to heavy loads, and relatively small resistance to light loads while affording maximum energy absorption to dampen tire shock and to reduce tire loading.

Therefore, it will be seen that my invention comprehends a novel shock strut comprising a pressure sensitive, automatically adjustable metering device capable of increasing orifice area under high pressures due to great loads or increased viscosity of the hydraulic fluid and capable of automatically decreasing the orifice area in response to low pressures resulting from lighter loads or decreased viscosity of the hydraulic fluid. The novel strut under conventional drop tests, such as are well known by those skilled in the art to be indicative of shock absorbing characteristics, has disclosed an unusual and unexpected ability to absorb energy and to vary resistance to compression in response to varying loads. Furthermore, the relatively great friction area presented by the stack of discs in the metering unit affords an unusual capacity for energy absorption.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. An hydraulic shock absorber comprising a cylinder having a closed end and adapted to contain an hydraulic medium, a support structure in said cylinder comprising a perforated tube connected at one end to the closed end of said cylinder, a sleeve mounted on the other end of the tube, an abutment member having a hollow shank extending through said sleeve into said tube and in threaded engagement with said sleeve, a piston extending into the other end of said cylinder, a wall in said cylinder between said piston and said abutment member connected to said sleeve and defining within said cylinder a high pressure chamber with said piston and a low pressure chamber with the closed end of said cylinder, passage means in said wall communicating with said high pressure chamber, a metering unit in said low pressure chamber between said wall and said abutment member and comprising a plurality of flat plates and resilient corrugated discs alternated with said plates and defining interstices therewith communicating with the low pressure chamber, said plates and discs being formed with passage means communicating with said interstices and said passage means in said wall, abutment means between said member and said unit, resilient means including a plurality of Belleville springs compressed between said abutment means and member for compressing said unit against said wall, said springs being stacked axially of said chamber and arranged in cupped relationship with their concave sides facing said abutment means, notches in the surface of said abutment means which engages said resilient means communicating with said low pressure chamber to accommodate the flow of said medium therebetween to dampen the action of said resilient means, and openings in said shank communicating with said low pressure chamber and the interior of said tube through said hollow shank.

2. An hydraulic shock absorber comprising a cylinder member adapted to contain hydraulic fluid, a piston member reciprocal in said cylinder member and defining a high pressure chamber therewith, a low pressure chamber in one of the members, said one member comprising a wall with an opening connected to the high pressure chamber, another opening through said wall connected between said chambers, an annular disc in the high pressure chamber having a central opening communicating with the first-mentioned opening, said disc being adapted to close the second-mentioned opening, spring means carried by said wall for yieldingly urging said disc to the closed position thereof, and a resilient expansible and contractible metering unit comprising a stack of discs, and means carried by said one member for compressing said stack against said wall, said stack having aligned central openings connected to the first-mentioned opening, alternate discs being resilient and radially fluted.

3. An hydraulic shock absorber comprising a cylinder member adapted to contain hydraulic fluid, a piston member reciprocal within said cylinder member, a wall carried by said cylinder member defining a high pressure chamber with a wall of said piston member, a low pressure chamber in one of said members, a port in the wall of said one member connecting said chambers, an axially expansible and contractible metering unit in the low pressure chamber having an axial opening connected to the port and having passage means connecting the opening to the low pressure chamber, an abutment carried by said one member in the low pressure chamber, a spring abutment bearing against said unit, spring means between and compressible against said abutments comprising a Belleville spring having its concave side bearing against a surface of one abutment, and damping means for said spring comprising a notch in said surface connecting the low pressure chamber to the space between said spring and said one abutment.

4. An hydraulic shock absorber comprising a cylinder adapted to contain hydraulic fluid and comprising a wall, a piston reciprocal in said cylinder and defining a high pressure chamber with one side of said wall, a low pressure chamber in said cylinder at the opposite side of said wall, a member carried by said cylinder in the low pressure chamber in spaced relationship to said wall, an abutment having a shank in threaded engagement with said member, an expansible and contractible resilient metering unit compressed between said abutment and said wall and comprising an opening connected to the high pressure chamber, and radial passage means connecting the opening to a portion of the low pressure chamber between said abutment and said wall, and passage means through said shank interconnecting portions of the low pressure chamber at opposite sides of said abutment.

5. An hydraulic shock absorber comprising a cylinder member adapted to contain hydraulic fluid, a piston member reciprocal in said cylinder member and defining a high pressure chamber therewith, a low pressure chamber in one of the members, a resilient expansible and contractible metering unit connecting said chambers comprising a plurality of annular discs having central openings connected to the high pressure chamber and closed against communication with the low pressure chamber except through interstices between said discs, a stack of Belleville springs, means carried by said one member for compressing said stack against said discs, a spring at one end of the stack abutting an adjacent disc, and means including passages between the abutting spring and disc formed in one thereof for accommodating flow of fluid therebetween for damping oscillation of said springs during expansion and contraction of said unit due to movement of said discs in response to fluctuations of the pressure of the fluid flowing through said interstices.

6. An hydraulic shock absorber comprising a cylinder member adapted to contain hydraulic fluid, a high pressure chamber in said cylinder member, a piston member reciprocal in said high pressure chamber, a low pressure chamber in one of said members, a passage connecting said chambers, means carried by said one member for metering flow of fluid through said passage, said means comprising a stack of alternately arranged flat annular plates and radially fluted annular plates, the central openings of said plates being aligned with said passage, said radially fluted plates being resilient, and means for compressing said stack to develop friction between said plates and the fluid flowing therebetween.

7. An hydraulic shock absorber comprising a cylinder member adapted to contain hydraulic fluid, a piston member reciprocal in said cylinder member and defining a high pressure chamber therewith, a low pressure chamber in one of the members, spaced abutments carried by said one member, one of said abutments having an opening connected to the high pressure chamber, a resilient expansible and contractible metering unit compressed between said abutments and comprising a stack of annular discs having central openings connected to the first-mentioned opening, and means carried by at least one of said abutments and disposed around the outer perimeters of said discs for maintaining the same in alignment.

8. An hydraulic shock absorber comprising a cylinder member adapted to contain hydraulic fluid, a piston member reciprocal in said cylinder member and defining a high pressure chamber therewith, a low pressure chamber in one of said members, an axially expansible and contractible metering unit connecting said chambers comprising a stack of annular discs with central openings connected to the high pressure chamber, and interstices between said discs connecting said openings to the low pressure chamber, said unit being compressed between abutments carried by said one member, alternate discs being resilient and radially fluted.

9. An hydraulic shock absorber comprising a cylinder member adapted to contain hydraulic fluid, a piston member reciprocal in said cylinder member and defining a high pressure chamber therewith, a low pressure chamber in one of the members, an expansible and contractible metering unit connecting said chambers and comprising a stack of annular discs having central openings connected to the high pressure chamber, and a stack of compressed Belleville springs acting against said discs to yieldingly resist movement of said discs apart from each other as fluid is forced therebetween, said springs being arranged in cupped relationship with their concave sides facing said unit to define a space between said stack and said unit communicating with said low pressure chamber to accommodate the flow of fluid therebetween and thus dampen the action of said springs as said unit is contracted and expanded.

10. An hydraulic shock absorber comprising a cylinder member including a wall, a piston reciprocal in said cylinder member and defining a high pressure chamber with said wall, a low pressure chamber in said cylinder member, a port through said wall connecting said chambers, a resilient expansible and contractible metering unit having a central opening connected to said port, and radial passage means connected to the low pressure chamber, and positioning means carried by said wall around the outer perimeter of said unit for guiding engagement therewith.

11. An hydraulic shock absorber comprising a cylinder member, a piston member reciprocal in said cylinder member and defining a high pressure chamber with a wall of said cylinder member, a low pressure chamber in one of the members, and a resilient metering unit carried by said one member comprising a plurality of resilient, radially fluted discs having central openings connected to the high pressure chamber and closed against communication with the low pressure chamber except through interstices between said discs.

12. An hydraulic shock absorber comprising a cylinder member adapted to contain hydraulic fluid, a piston member reciprocal in said cylinder member and defining a high pressure chamber with a portion thereof, a low pressure chamber in one of said members, an axially expansible and contractible metering unit connecting said chambers comprising a plurality of resilient, radially fluted annular discs having central openings connected to the high pressure chamber.

13. An hydraulic shock absorber comprising two relatively movable elements forming a working chamber and a reservoir chamber, and having a port therebetween through which fluid is transferred from one chamber to the other to dissipate energy, a resilient metering unit carried by one of said elements comprising a plurality of resilient corrugated discs defining interstices therebetween and having axial passages communicating with said working chamber through said port and closed from communication with said reservoir chamber except through said interstices between said discs, said port being of the same or smaller diameter than said passages and coaxial therewith and said passages being of substantially equal diameters whereby flow of fluid from the port into said passages is axially of the device and thereafter solely transaxially of the device whereby said plates were caused to spread apart during surges of high pressure.

14. In metering means for a hydraulic shock absorber, a plate member, a Belleville spring member having its concave side facing the plate member and bearing along its edge thereagainst, and passage means in at least one of said members communicating with the space between said spring member and said plate member for metering fluid flowing to and from said space for damping the action of said spring member.

RAYMOND WATTS.

REFERENCES CITED

The following references are of record in the file of this patent:

UNITED STATES PATENTS

| Number | Name | Date |
|---|---|---|
| 977,427 | Armstrong | Dec. 6, 1910 |
| 1,351,141 | Thompson | Aug. 31, 1920 |
| 1,704,527 | Becker | Mar. 5, 1929 |
| 2,042,462 | Hahn | June 2, 1936 |
| 2,196,089 | Wallace | Apr. 2, 1940 |
| 2,352,351 | Thornhill | June 27, 1941 |
| 2,417,715 | Stewart | Mar. 18, 1947 |
| 2,426,238 | Platon | Aug. 26, 1947 |
| 2,471,294 | Watts | May 24, 1949 |